June 24, 1947.  E. BRUCE  2,422,654
TIME MEASURING SYSTEM
Filed Aug. 19, 1943  3 Sheets-Sheet 1

INVENTOR
E. BRUCE
BY: Franklin Mohr
ATTORNEY

INVENTOR
E. BRUCE
BY: Franklin Mohr
ATTORNEY

June 24, 1947.   E. BRUCE   2,422,654
TIME MEASURING SYSTEM
Filed Aug. 19, 1943   3 Sheets-Sheet 3
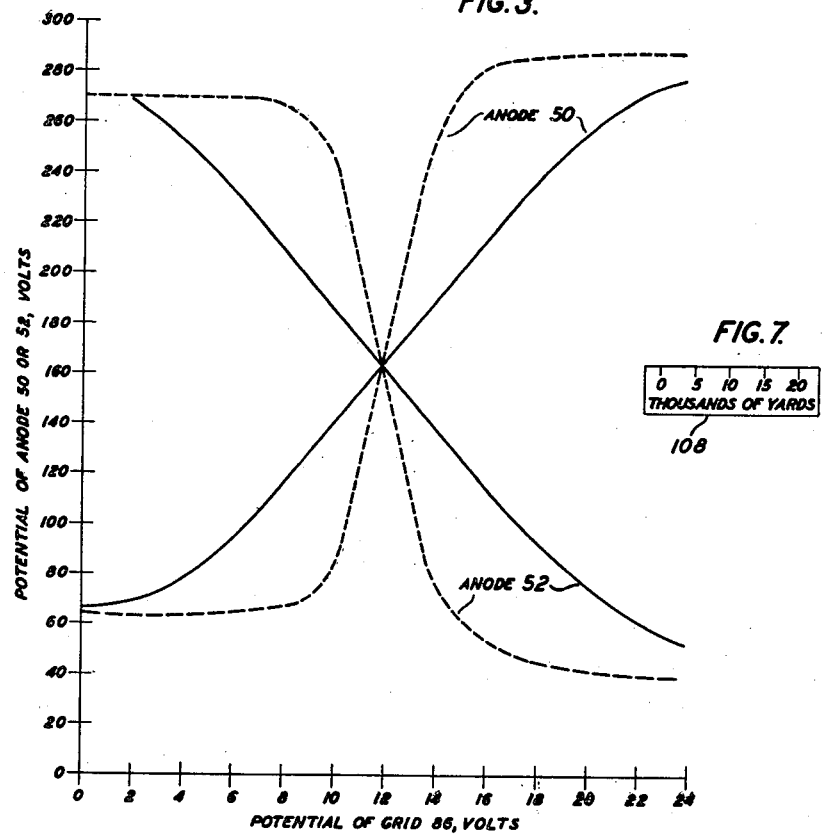
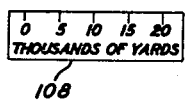
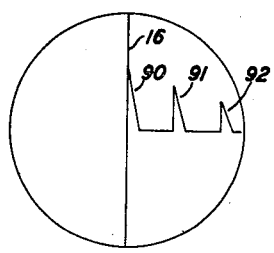
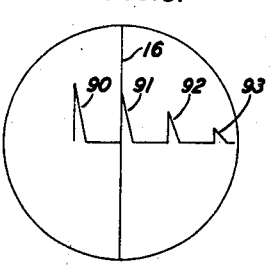
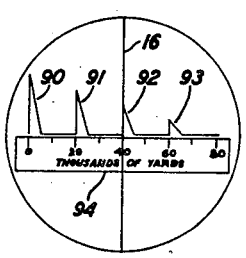
INVENTOR
E. BRUCE
BY: Franklin Mohr
ATTORNEY Patented June 24, 1947

2,422,654

UNITED STATES PATENT OFFICE 2,422,654

TIME MEASURING SYSTEM

Edmond Bruce, Red Bank, N. J., assignor to Bell Telephone Laboratories, Incorporated, New York, N. Y., a corporation of New York Application August 19, 1943, Serial No. 499,211

7 Claims. (Cl. 161—15)

This invention relates to systems for measuring distances and time intervals by means of traveling waves and, more particularly, to devices for measuring the time interval between an outgoing pulse and a reflected pulse in terms of a voltage change in a resistance-capacitance circuit. Such a measuring device is commonly calibrated in terms of the distance traveled by a wave with a known velocity of propagation and may be used, for example, in determining the range of a target, in which case it is known in practice as an RC ranging unit.

While the invention may be used in many other organizations where time or distance measurements are required, the illustrative embodiments disclosed hereinafter are of the type known as radar systems, in which a traveling wave is dispatched from a given point to a distant surface or object and a reflection is received at the first point, the distance of the object or surface being measured by the time required for the wave to travel to the remote point and for the reflection to return.

In accordance with the invention, at the instant of sending out the traveling wave, a charging or discharging current is started in a resistance-capacitance circuit and employed to initiate a time sweep in a cathode-ray oscilloscope. The arrival of the reflected wave at the measuring station is utilized to produce a momentary deflection of the cathode ray in a direction perpendicular to the motion caused by the time sweep, thereby producing an indication or mark from which the distance to the remote point is determined by reference to an index, stationary with respect to the screen of the oscilloscope, and the setting of a potentiometer in a reference circuit.

A feature of the invention is the use of a resistance-capacitance sweep circuit of fixed time constant comprising a resistor of fixed resistance value and a condenser of fixed capacity value, the starting point of the sweep with reference to the stationary index being varied by adjusting the movable contact of a potentiometer in a reference circuit. Assuming a horizontal time sweep, a measurement is made by observing the potentiometer setting which causes a vertical deflection to coincide with the stationary index.

Another feature of the invention is the use of a null method whereby a precise setting of the potentiometer may be effected. The stationary index is caused to correspond to a condition of balanced voltages on the horizontal deflecting plates of the oscilloscope. By utilizing the balanced voltages in the setting of the indicator, it is possible to use relatively low charging voltages in the sweep circuit, combined with amplification to give relatively large deflecting voltages in the indicating device, without loss of accuracy. This becomes possible because departures of the amplifier from linearity in response to the charging voltages are of no consequence when two deflecting voltages are balanced to obtain a null reading.

A further feature of the invention is a provision for expanding or magnifying any portion of the distance or range scale without restricting the total range observable in the indicating device.

A still further feature is a linearizing resistance by means of which the accuracy of the range indications may be increased particularly when these are represented upon a uniformly divided scale directly related to the movable arm of a uniformly wound potentiometer.

Other features include the use of only a small part of the charging or discharging cycle in order to obtain a nearly linear rise or fall of potential as a function of time; the use of an exponential potentiometer, if desired, to utilize a larger part of the cycle; a return trace blanking device for an oscilloscope; and an electronic index mark.

The present invention dominates with respect to common subject-matter a copending application of George Hecht, Serial No. 502,619, filed September 16, 1943, assigned to the same assignee as the present application.

In the present application, it is intended to claim broadly a system for measuring recurrent substantially equal time intervals by comparison of a time sweep potential and a reference potential, the starting potential of the time sweep being adjustable to make the potential variation of the time sweep during the interval to be measured equal to the potential difference between the selected initial potential of the time sweep and the reference potential.

In the present application, it is intended to claim specifically the circuit arrangement in which a potentiometer appears as an element separate and distinct from the timing circuit for the time sweep. It is further intended to claim herein arrangements for linearizing the relationship between the potentiometer setting and the time or distance being measured.

The copending application of Hecht, Serial No. 502,619, discloses and claims a specifically different arrangement which is an improvement upon the present invention where reduced weight and bulk of apparatus are desirable or imperative even though accompanied by some reduction in accuracy.

The present invention dominates with respect to certain common features a copending application of L. A. Meacham, Serial No. 505,024, filed October 5, 1943, assigned to the same assignee as the present application.

In the present application it is intended to claim broadly a time measuring system in which an exponentially rising potential of fixed time constant is impressed upon the control electrode of an electronic device and a potential is applied to the cathode thereof, the cathode potential being variable to determine a measured time delay period with respect to the start of said exponentially rising potential by an amount determined by said cathode potential.

In drawings,

Fig. 3 is a graph of amplifier operating characteristics;

Figs. 4, 5 and 6 show illustrative patterns which may be observed on the screen of the oscilloscope in the system of Fig. 2;

Fig. 7 shows an alternative form of a range scale which may be used in place of a scale shown in Fig. 6.

Figure 1:
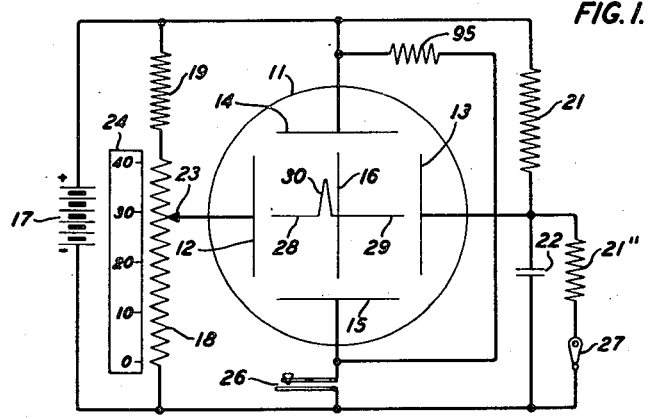
Fig. 1 is a schematic diagram useful in explaining the principle of operation of the sweep circuit and range potentiometer.

Referring to Fig. 1, a viewing screen 11 of a cathode-ray oscilloscope is shown schematically with a pair of plates 12 and 13 for horizontal deflection of the cathode ray and another pair of plates 14 and 15 for vertical deflection of the ray. A vertical index line or range mark 16 may be engraved or otherwise marked upon the screen, preferably at the position the cathode ray takes when plates 12 and 13 are at the same potential. Across the terminals of a source 17 of electromotive force, illustrated as a battery, there are connected a potentiometer 18 and a resistor 19 in one branch, and a sweep circuit comprising a resistor 21 of fixed resistance and a condenser 22 of fixed capacity in another branch. The potentiometer 18 has a movable contact arm 23 provided with a scale 24 adjacent thereto. The plate 12 is connected to the arm 23 and the plate 13 is connected to the junction of the resistor 21 and the condenser 22. The plates 14 and 15 are connected together by a resistor 95 and individually connected to the respective terminals of the source 17, the connection from one of the plates 14 and 15 being normally broken by a momentary contact key 26, here shown in the lead to plate 15. A switch 27 is provided for connecting a resistor 21″ across the terminals of the condenser 22 and for breaking the said connection when desired.

The arrangement shown in Fig. 1 may be employed in the following manner to measure a time interval. The beginning of the interval to be measured is to be marked by opening the switch 27, the interval continuing until its end is marked by a momentary closing of the contacts of the key 26. It is contemplated that the arrangement shown will be most useful where recurrent time intervals of equal or very nearly equal duration occur in rapid succession as is common in range measuring systems.

The manner of operation of the arrangement of Fig. 1 is as follows: In the normal condition of the circuit, with the switch 27 closed, a predetermined voltage is maintained across the terminals of the condenser 22 by current from source 17 flowing through the resistors 21 and 21″. Upon opening the switch 27, the condenser voltage begins to rise as the condenser accumulates additional charge which can no longer leak away. The charge follows a well-known law of increase, varying very nearly linearly with the time during the early part of the charging cycle and then less rapidly, finally approaching the battery voltage as an asymptote. The zero mark on the scale 24 is placed at such a point as to provide equal initial voltages on the plates 12 and 13 when the movable arm 23 is set opposite the zero mark. The resistance values of the resistor 19 and the potentiometer 18 are so proportioned that with the arm 23 set for maximum range the initial potential on the plate 12 is such as to deflect the cathode ray to the extreme edge of the screen, preferably at the left side as at 28 in the figure, the upper terminal of the source 17 being positive. When the switch 27 is opened with the arm 23 set for maximum range, the rising potential of the condenser 22 will eventually attain the potential of the arm 23 and thereafter rise above that potential. At the instant when the condenser 22 and arm 23 are at equal potentials the cathode ray will be at the range mark 16.

Provided that the closing of the key 26 marking the end of the interval to be measured occurs before the cathode ray has completed its sweep across the screen as at 29, a mark 30 will be produced on the screen at the instant of closing of the key 26, due to vertical deflection of the cathode ray in known manner. A time measurement is made by moving the arm 23 along the potentiometer 18 to bring the starting point of mark 30 precisely at the range mark 16, a process which becomes entirely feasible if the mark 30 appears repeatedly.

It is evident that not only the starting point of the cathode ray sweep but also the starting position of a mark such as 30 will change with the setting of the arm 23, that is, with the reading of the scale 24. If the mark 30 occurs to the left of the center line 16, it is an indication that the arm 23 has been set to too large a reading and should be moved downward according to Fig. 1. When this change in setting has been made, if the interval to be measured has not greatly changed meanwhile, the beginning of the next sweep of the cathode ray and likewise the location of the mark 30 will appear further to the right than before, and may be brought closer to the center by continued adjustment. If, on the other hand, the mark 30 is first observed to the right of the index 16, the arm 23 should be moved to a higher position in Fig. 1, thereby causing the next sweep of the cathode ray to start a little farther to the left, bringing the mark 30 also over toward the left. When the mark 30 coincides with the range mark 16, the reading of the scale 24 will show the true measurement of the time interval. The scale 24 may be calibrated against known time intervals in any convenient manner. After each operation of the key 26, it is necessary to close the switch 27 thereby discharging the condenser 22 before beginning the next time interval to be measured. As is well known, the various keying operations that have been described may be performed by automatic means.

The capacitance of the condenser 22 is preferably made large in order that stray changes in the capacitance of the timing circuit will not appreciably affect the accuracy of measurement.

Figure 2:
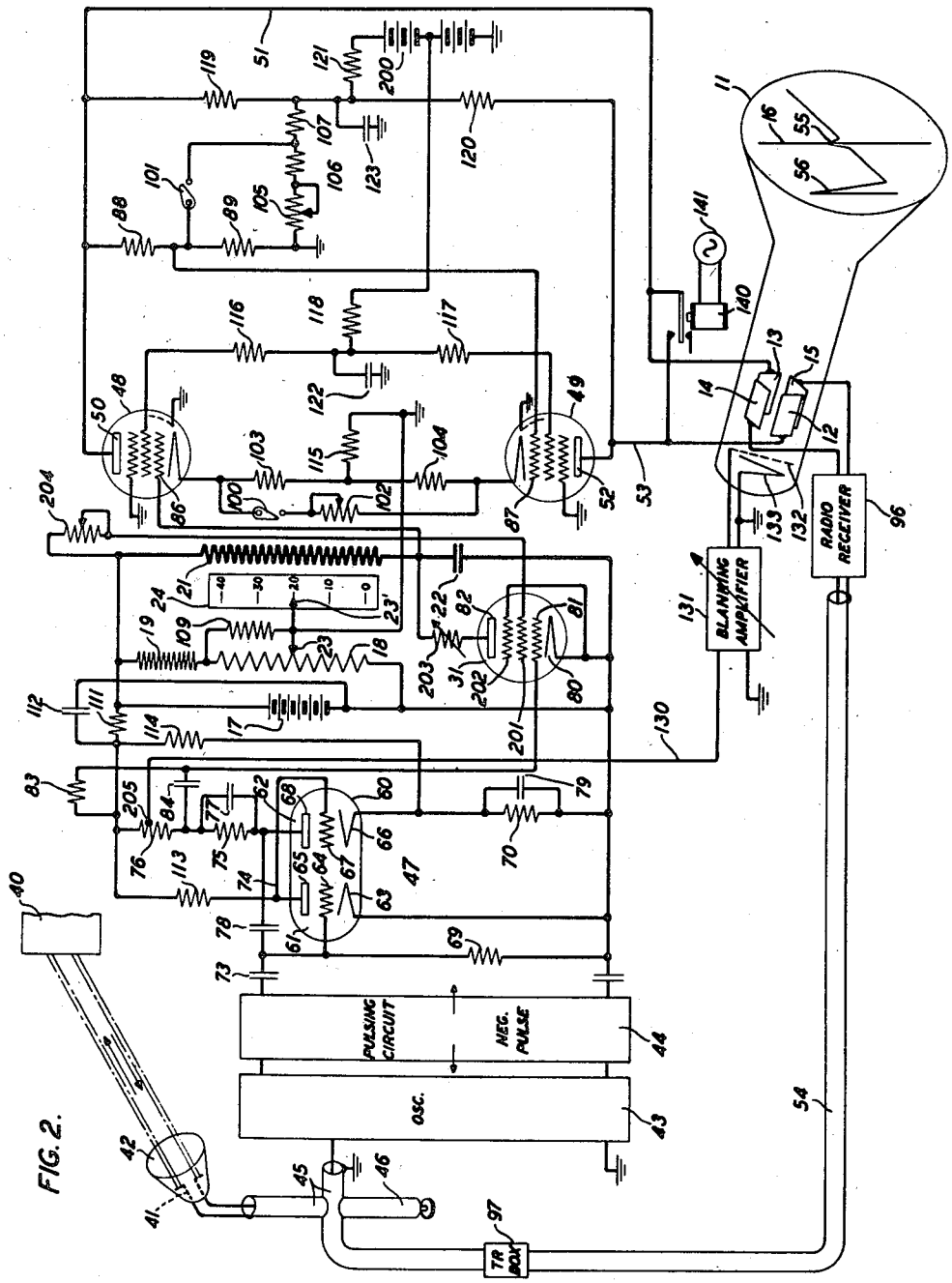
Fig. 2 is a schematic representation of a radar system embodying the invention.

Fig. 2 shows an embodiment of the measuring device of the invention in a radar system. The object, the distance of which is to be measured is represented at 40. At the measuring station there are provided projecting and receiving means for electromagnetic waves which means may take the form of a dipole antenna 41 mounted at the focus of a paraboloidal reflector 42 with suitable means (not shown) for directing the axis of the reflector toward the object 40. The antenna 41 may, if desired, serve both for transmitting and receiving as illustrated, or separate transmitting and receiving devices arranged for simultaneous pointing toward the object may be used, or a nondirectional transmitting antenna may be employed with a directional receiver (or vice versa).

The waves to be projected are generated by an oscillator 43 which may be of any known variety, preferably an ultra-high frequency generator of some kind. The oscillator 43 is controlled by a pulsing circuit 44 of any suitable kind and the output of the oscillator is connected to the antenna 41 by a transmission line system 45 which may be of the usual coaxial type and which may be provided with a tuning stub 46.

The pulsing circuit 44 may also serve to control the starting and stopping of the charging current in the sweep circuit, preferably through the intermediary of a start-stop circuit indicated generally at 47.

The start-stop circuit 47 may be directly connected to the sweep circuit the elements of which latter are shown substantially as in Fig. 1 and are correspondingly numbered in Fig. 2. A vacuum tube 31 takes the place of the switch 27 and the resistor 95 and key 26 are replaced by radio receiving means.

In place of the direct connection from the timing circuit to the horizontal deflecting plates of the oscilloscope these connections are made through the intermediary of an amplifier illustrated as comprising a pair of vacuum tubes 48 and 49 each of which may contain a cathode, an anode, a control grid, a screen grid and one or more additional electrodes, as desired, adapted to suppress secondary electron emission, form the electron stream into a concentrated beam, or, for other functions. The oscilloscope screen 11 is shown in Fig. 2 and corresponds to the similarly numbered screen in Fig. 1. The deflecting plates 12, 13, 14 and 15 are represented in perspective view in Fig. 2 and the vertical center index 16 is shown on the screen 11.

The tube 48 has its anode 50 connected to the oscilloscope deflecting plate 13 through a lead 51 and the tube 49 has its anode 52 connected to the deflecting plate 12 through a lead 53. The vertical deflection plates 14 and 15 are connected respectively to the output terminals of a radio receiver 96, the input terminals of which are connected to the conductors of a transmission line 54 which may be connected with the antenna 41 through a protective device 97, illustrated as a TR box, and the transmission line 45. The function of the TR box, which is well known, is to transmit relatively weak waves from the antenna 41 to the radio receiver 96 but to establish a substantial short circuit when a relatively strong wave from the oscillator 43 is impressed, thereby protecting the radio receiver from the force of strong locally produced waves while permitting reception of reflected waves.

*Operation*

The general scheme of operation of the system of Fig. 2 is as follows. The pulsing circuit 44 serves to render the oscillator 43 normally disabled but periodically energizes the oscillator to permit a short train of oscillations to be generated. Pulsing circuits and their operation are well known to those skilled in the art and are believed to require no detailed description herein. The train of oscillations is transmitted from the oscillator 43 through the transmission system 45 to energize the antenna 41 whereby an electromagnetic wave pulse is projected by the projector 42. The pulse is preferably of only a few microseconds duration or less and the separate pulses are preferably emitted at such intervals that an emitted pulse may travel to the most distant object to be tested and return to the projector, leaving time for discharging the condenser in the sweep circuit before the succeeding pulse is sent out. The intervals between pulses do not, however, need to be of uniform length. The returning pulse, produced by scattered radiation or reflection from the object 40 will be received in the projector 42 and will energize the antenna 41. The received wave in the antenna is transmitted through the TR box 97 and the line 54 to the radio receiver 96 to energize the vertical deflecting plates 14 and 15 of the oscilloscope and produce a mark such as shown at 55, representing the incoming pulse.

As it may be desirable also to represent the outgoing pulse on the screen of the oscilloscope, a suitable amount of direct transmission may be arranged between the lines 45 and 54 through the TR box 97 or otherwise in known manner to permit the outgoing pulse to be transmitted to the radio receiver as well as to the antenna 41, and in this case the outgoing pulse will make a mark such as shown at 56, appearing to the left of the mark 55. The spacing between corresponding parts of the marks 55 and 56 due to the action of the sweep circuit and the amplifying tubes 48 and 49 is a measure of the distance of the object 40 from the antenna 41. The position of the marks 55 and 56 with respect to the index line 16 may be adjusted by moving the potentiometer arm 23 similarly, except for details introduced by the amplifiers, as has been described above in connection with Fig. 1.

The start-stop circuit, the sweep control circuit and the horizontal deflection amplifier will now be described in more detail.

*Start-stop circuit*

The start-stop circuit 47 includes two vacuum tube triodes which may, if desired, be enclosed in a single envelope 60. The triodes are interconnected to operate as what is commonly called a single-pulse multivibrator. The left-hand triode, designated 61 is, in the absence of an input from the pulsing circuit 44, normally conducting. The right-hand triode, designated 62, on the other hand, is normally not conducting. The triode 61 comprises a cathode 63, a grid 64, and an anode 65, and the triode 62 has corresponding elements 66, 67 and 68. The ungrounded battery 17 may constitute the anode supply source for the triodes 61 and 62 and the anode and screen grid supply source for the tube 31 as well as the source of potential for charging the sweep circuit. A separate grounded battery 200, which may be in two sections, serves as the anode and screen grid supply source for the tubes 48 and 49. A resistor 111 and a condenser 112 may form an anode supply filter for the triodes 61 and 62, and a resistor 121 and condenser 123 an anode supply filter for the tubes 48 and 49. A resistor 118 and condenser 122 may form a screen grid supply filter for the tubes 48 and 49. The screen grid circuit of the tubes 48 and 49 may include load resistors 116 and 117 respectively, and the anode circuits may include other load resistors 119 and 120, respectively.

The triode 61 has its grid 64 normally at the potential of the cathode 63 by connection through a resistor 69, and the triode conducts anode current through an anode resistor 113. The triode 62 is normally blocked by having its grid 67 biased to anode current cut-off by a negative potential drop in a cathode resistor 70 due to current from the battery 17 through a resistor 114, the anode 68 being at approximately the potential of the positive terminal of the battery 17. The resistor 70 may be shunted by a condenser 79.

The pulsing circuit 44 is preferably arranged to furnish a negative pulse to the grid 64 through a coupling condenser 73. When the pulse is applied, a potential drop is impressed upon the resistor 69, the triode 61 thereby being driven abruptly to anode current cut-off. This causes the potential of the anode 65 to rise rapidly in the positive direction, approaching the full supply voltage, and the grid 67 of the triode 62 is carried along with the anode 65 to a positive potential by the action of an interconnecting lead 74. Anode current immediately starts to flow in the triode 62, passing through a pair of resistors 75 and 76, and charging the condenser 79 and a condenser 77, the latter connected in parallel with the resistor 75. The potential drop in these resistors causes the anode 68 to become less positive, approaching the potential of the cathode 66. A condenser 78 is provided as a coupling between the anode 68 of triode 62 and the grid 64 of triode 61, and is normally charged to approximately the supply voltage. When the potential of the anode 68 is lowered, the condenser 78 starts to discharge through the resistor 69 and through the anode-cathode internal resistance of the triode 62. During the discharge time of the condenser 78 the grid 64 is held below cut-off, the charge on the condenser 78 replacing in the resistor 69 the energizing pulse from circuit 44, which pulse meanwhile has ceased. When the condenser 78 ceases to discharge, the current through the resistor 69 stops, the grid 64 has returned to a potential above the anode current cut-off and the triode 61 conducts again. This brings the grid 67 back down below anode current cut-off of triode 62, whereupon the potential of the anode 68 rises again toward the full supply voltage and the condenser 78 is recharged rapidly through the resistors 75 and 76 and the low grid-cathode resistance of the triode 61, shunting the resistor 69, which results from the positive potential on grid 64. At the same time the condenser 77 is discharged and condenser 79 is partially discharged. When this cycle of operations has been completed the circuit is ready to receive the succeeding pulse from circuit 44. The time interval from the receipt of a pulse from circuit 44 to the completion of the recovery of circuit 47, which interval limits the total maximum sweep time and hence the maximum range of the system, may be varied by adjusting the capacity of the condenser 78 or the resistance of the resistor 69, or both. For proper operation, also, the minimum interval between pulses will exceed the maximum sweep time by a sufficient margin to allow the recovery to take place.

Sweep control

The function of the start-stop circuit 47 in controlling the charge and discharge of the timing elements of the sweep circuit will next be described.

The switching tube 31, which is normally in the conducting condition, may be a pentode having a cathode 80, a control grid 81, a screen grid 201, a suppressor grid 202 connected with the cathode 80, and an anode 82. The normal conducting condition of the tube 31 is attained by connecting the control grid 81 to the positive side of the battery 17 through a resistor 83, preferably adjusted to permit a small amount of grid current to flow between the control grid 81 and the cathode 80, and through the filter resistor 111. By making the timing resistor 21 a high resistance compared with the internal plate-cathode resistance of tube 31, the potential of the anode 82 is readily made relatively low, having a value such as 2 or 3 volts. The initial voltage effective across the condenser 22 due to the tube 31 may be adjusted to the desired value of about 12 volts by means of a rheostat 203 in series with anode 82.

The grid 81 is coupled through a condenser 84 to the junction of the resistors 75 and 76 in the anode circuit of the triode 62 of the start-stop system. When the triode 62 is made conducting abruptly as above described and the potential of its anode 68 falls, there is a resulting sudden surge of current between the grid 81 and the cathode 80 externally of the tube 31 through resistor 75, through the lowered anode-cathode resistance of the triode 62 and through resistor 70. This current is in such a direction as to overcome the effect of the grid current flowing to the grid 81 of the tube 31 from the battery 17 through the resistor 83 and carries this tube immediatey below cut-off. The anode 82 then begins to rise in potential with the result that the condenser 22 begins to increase its charge through the timing resistor 21 according to a well-known exponential law. The rise of potential upon the condenser 22 continues to about 28 volts at which time the start-stop circuit recovers and the potential of the anode 68 of triode 62 becomes rapidly more positive again. Thereupon the condenser 84 recharges through the resistor 76 and the grid-cathode resistance of tube 31 and the grid 81 of the tube rises in potential until the tube is suddenly made conducting again. This action is aided by the flow of grid current to grid 81 through the resistor 83. The charging of the condenser 22 through the resistor 21 is thereby abruptly stopped and the condenser discharges rapidly through the rheostat 203, which is preferably of low resistance, and through the now low anode-cathode impedance of the tube 31. When the discharge has been completed, the timing circuit becomes inactive and remains so until another pulse is received from the circuit 44 to actuate the circuit 47 and repeat the above-described cycle. When a pulse is received by the circuit 47, from circuit 44, it in turn starts the rise in voltage of the timing circuit condenser 22 as described. The result is that after passing through the deflection amplifier to be described, the cathode ray sweeps across the screen at a substantially constant rate beginning almost immediately upon the receipt of the starting pulse, the only residual delay being in the start-stop circuit, which latter delay has been found to be a fraction of a microsecond in a representative case. It is also feasible to avoid this residual delay in a start-stop circuit by applying suitable pulses from circuit 44 directly to the grid 81 of the sweep circuit in addition to the start-stop circuit which then acts only as a locking device to maintain the duration of the timing action after the pulse ceases.

It will be evident to those skilled in this art that a discharging current may be utilized equally well as a charging current by suitable reorganization of the sweep circuit.

Horizontal deflection amplifier

The tubes 48 and 49 operate as an inverter type direct current amplifier in known manner for delivering a balanced or push-pull output when excited from a single-sided or unbalanced source. The input is applied to the control grid 86 of the tube 48. The tube 49 has a corresponding control grid 87 which derives its initial voltage of about +12 volts, equalling the initial voltage on grid 86 for a zero range setting of potentiometer 18, from a potentiometer comprising a pair of resistors 88 and 89 in the anode circuit of the tube 48. The anodes 50 and 52 of the tubes 48 and 49, respectively, are, as above noted, connected to the plates 13 and 12, respectively, of the cathode ray oscilloscope. The circuit constants of the amplifier tubes and the sensitivity of the cathode ray oscilloscope were so adjusted in an illustrative embodiment of the invention which was built, so that a variation in the input potential, on the grid 86 from approximately 4 volts to 20 volts positive (a total change of 16 volts) serves to swing the cathode-ray beam from left to right approximately 4½ inches across the face of the cathode-ray oscilloscope screen. The balanced voltage corresponding to the center index line of the cathode-ray screen was in this case approximately 12 volts. The solid line curves in Fig. 3 show the characteristic of the amplifier as thus described. It will be noted that the variation of the grid potential from 4 to 20 volts causes the anode 50 to rise in potential from approximately 80 volts to 260 volts while at the same time the anode 52 falls from approximately 250 volts to 80 volts. The characteristic curves are seen to cross at approximately 12 volts on grid 86.

The range mark 16 corresponds to a definite potential on the grid 86 of the deflection amplifier, 12 volts in the system that was built, and it is this voltage to which the potentials along the sweep are referred and with which they are, in effect, balanced. By using the push-pull type of amplifier it is possible to maintain the average potential of the deflection plates 12 and 13 at a constant value. As a result it is found that the sharpness of focus of the cathode ray is improved.

In the illustrative embodiment that was built, the range unit was designed for accurate measurement of ranges from 0 to 40,000 yards and for observation or approximate range measurement from 0 to 80,000 yards, the approximate measurements being made with the aid of a fixed scale on the screen of the oscilloscope. Such a scale is indicated at 94 in Fig. 6. The time constant of the resistance 21 and conductor 22 combination was so chosen that in 488 microseconds the potential across the condensers from start to stop rises approximately 16 volts, 488 microseconds being the time of travel of an electromagnetic wave to the object and return when the range of the object is 80,000 yards (163.91 yards per microsecond). The time constant of the start-stop circuit, condenser 78 and resistor 69 was adjusted accordingly.

The 16-volt rise in this embodiment is preferably only a small part of the total voltage of the battery 17, in this case made 300 volts. The time rate of change of the condenser voltage during the sweep is accordingly practically constant, providing a substantially linear time scale. The range measurement can then be effected by comparing the sweep voltage swing with a direct current reference voltage obtainable from a uniformly wound potentiometer.

With the potentiometer arm 23 of the potentiometer 18 set at the zero end of the range scale, the potential between the grounded arm 23 and the grid 86 of the tube 48 was made about +12 volts by adjusting potentiometer 203. The initial potential of the grid 86 is then the same as the potential of the condenser 22, making the potential on the grid 86 at the end of the sweep 28 volts. Hence, the range trace at zero range starts at the center of the cathode-ray screen and runs beyond the edge of the screen at the right.

For other settings of the potentiometer arm 23, the whole trace is moved to the left on the cathode-ray tube. At maximum range setting of potentiometer arm 23 the potential supplied to the grid 86 at the beginning of the rise in sweep voltage was designed to be +4 volts, that is, +12 volts across condenser 22 and —8 volts across potentiometer 18. In this position of the arm 23 the scale reading on the scale 24 is 40,000 yards, the range trace starts at the left side of the screen and crosses the center index line after a +8 volt rise corresponding to the 40,000 yards indicated. The full sweep corresponding to 80,000 yards covers the width of the screen during the +16 volt rise during the sweep. In other words, the scale 24 indicates the index line ranges from 0 to 40,000 yards as the start of the trace moves from the center of the screen to the left-hand side by adjustment of the range potentiometer but when the arm 23 is set at maximum range of 40,000 yards, the trace observable upon the cathode-ray oscilloscope to the right of range mark 16 extends to 80,000 yards.

To promote precision of setting and accuracy of reading, a pointer 23' may be geared to the arm 23 in known manner so that the scale 24 may be greatly extended and divided as finely as desired. Precaution may be taken against error due to parallax between the range mark 16 and the cathode-ray trace by placing the range mark on the inside of the glass during manufacture.

The range mark 16 may also be made electronically by periodically short-circuiting the horizontal deflecting plates 12 and 13, for example by means of a relay 140 operated, if desired, from a 60-cycle alternating source 141. In the short-circuiting position of the relay, the outgoing radio pulse as well as the reflected pulses merge to produce a single vertical deflection at the tube center which may be used as an electronic range mark. Alternately presenting the pattern and the electronic range mark at a 60-cycle rate produces no apparent flicker, since this rate is well above the discernment of the human eye. Switching transients do not appear, since their rate of reproduction is small compared to the base rate of the pattern and their positions are seldom superimposed.

The following tables show the values of the resistances and capacitances which were employed in the embodiment of Fig. 2 which was built:

| Element | Resistance, ohms |
|---|---|
| 18 | 2,000 |
| 19 | 73,000 |
| 21 | 200,000 |
| 69 | 1,000,000 |
| 70 | 15,000 |
| 75 | 25,000 |
| 76 | 25,000 |
| 83 | 500,000 |
| 88 | 240,000 |
| 89 | 22,000 |
| 102 | 225 |
| 103 | 900 |
| 104 | 900 |
| 105 | 1,000 |
| 106 | 6,000 |
| 107 | 150,000 |
| 109 | 100,000 |
| 111 | 330 |
| 113 | 100,000 |
| 114 | 60,000 |
| 115 | 600 |
| 116 | 150 |
| 117 | 150 |
| 118 | 500 |
| 119 | 20,000 |
| 120 | 20,000 |
| 121 | 100 |

| Element | Capacitance, mf. |
|---|---|
| 84 | 0.06 |
| 112 | 0.25 |
| 122 | 0.5 |
| 123 | 0.5 |

| Element | Capacitance, mmf. |
|---|---|
| 22 | 1,500 |
| 73 | 20 |
| 77 | 50 |
| 78 | 130 |
| 79 | 500 |

Tube 31 was a 6J5; tubes 48 and 49 were 6AG7s; and tube 60 was a 6SN7-GT. Batteries 17 and 200 were 300 volts each.

Fig. 4 shows an illustrative trace on the screen of the oscilloscope when the potentiometer arm 23 is set at range zero. A number of pulses are represented as being observable. The mark 90 represents an outgoing pulse which is being used to check the zero reading by observing the alignment of the mark 90 with the index 16. Other marks 91 and 92 represent received pulses from objects at various distances.

It will be evident at this point that range measurements near zero can be made without the necessity of using a preliminary pulse or "pre-knock" from the transmitter to start the sweep before the radio pulse is sent out. The start-stop and sweep circuits have been found, in practice, to operate rapidly enough so that the outgoing radio pulse appears at or after the beginning of the sweep. It is therefore feasible, if desired, to employ a spark transmitter, in which case no "pre-knock" is available.

Fig. 5 shows the trace on the screen of the oscilloscope under the same conditions as were assumed for Fig. 4 except that the potentiometer arm 23 has been moved to indicate 20,000 yards on the scale 24. It is found that the mark 91 is now aligned with the range mark 16 indicating that the distant object from which the mark 91 was received has a range of 20,000 yards. The mark 92 and another mark 93 are observable to the right of the index 16.

Fig. 6 shows the trace on the screen of the oscilloscope under the same conditions as were assumed for Figs. 4 and 5 except that the potentiometer arm 23 has been set for 40,000 yards, and a fixed scale 94 has been placed adjacent to the screen. It is now found that the mark 92 is at the center of the screen, indicating that the object producing this mark is at a range of 40,000 yards. The scale 94 reveals that the marks 90, 91 and 93 represent ranges of 0, 20,000 and 60,000 yards respectively. In this case, the mark 92 is the only one for which an accurate measurement is being made, the others being observed upon the screen and measured approximately by the scale 94.

For simplicity, the scale 94 in Fig. 6 is shown as linear but in practice the scale will be somewhat non-linear, due principally to the amplifier characteristic which is not linear over the entire input voltage range from 4 to 20 volts. The cathode ray does not move at a strictly constant speed across the screen except over the center portion where the amplifier characteristic is substantially linear. This fact, however, does not affect the linearity of the scale 24 since a measurement using that scale is always made at the voltage balance point, 12 volts in Fig. 3. The fixed scale 94 is to be calibrated to take care of the non-linearity of the amplifier characteristics.

In order to bring the out-pulse 90 to coincide precisely with the range mark 16 when the scale 24 reads 0, either the rheostat 203 may be adjusted or the voltage of the screen grid 201 may be adjusted by means of a rheostat 204. By virtue of this adjustment it has been found possible to use the same range mark for all measurements even though the amplifier tubes 48 and 49 may be replaced by others.

*Expanded sweep*

To facilitate range measurement and to observe the wave shape of echo pulses, provision has been made to magnify the scale of the horizontal trace in the oscilloscope at the center of the screen. This magnification is accomplished by increasing the voltage gain of the deflection amplifier while at the same time maintaining substantially at the grid 86 the null or range mark balance point. In this way the calibration of the scale 24 is not affected. In practice, a magnification of four times is readily obtained and this value will be assumed in what follows:

Using the system as shown without the magnifying feature (commonly referred to as the main sweep) the instantaneous voltage on the grid 86 for the zero range setting of arm 23 is equal to the voltage on the grid 87 (or vice versa), that is, 12 volts. If the tubes 48 and 49 are to provide balanced voltages to the deflecting plates of the oscilloscope, the voltage gain from the grid 86 to the anode 50 of the tube 48 must equal the voltage loss from the anode 50 to the grid 87 of the tube 49; namely, the voltage loss in the potentiometer 88, 89 which feeds the grid 87. Moreover, this condition must still obtain when the gain of the amplifier is increased for the purpose of magnifying the scale.

For operation using the magnified scale (commonly referred to as the expanded sweep), switches 100 and 101 are provided. The switch 100 places a rheostat 102 in shunt connection across a pair of individual cathode feedback resistors 103 and 104 which normally connect the cathodes of the tubes 48 and 49 to ground through a resistor 115. The shunting effect of the rheostat 102 upon the resistors 103 and 104 reduces the amount of negative feedback in the tubes 48 and 49 with a resultant increase in voltage amplification. This change calls for an increase in loss in the potentiometer 88, 89 to offset the increase in gain. On the other hand, the grid 87 of the tube 49 must have a direct current potential of 12 bolts to maintain the same balance point as on the main sweep. Closure of the switch 101 connects a potential divider comprising a rheostat 105 and resistors 106 and 107 to apply a portion of the supply voltage to the grid 87 to modify the potential of the grid 87. In this manner, the direct current potential of 12 volts on the grid 87 may be retained, while the alternating current voltage swing is reduced to compensate for the increased gain in the tube 48. The amplifier characteristic curves for the expanded sweep are shown by the broken lines in Fig. 3.

To provide for a zero range adjustment of the expanded sweep, the rheostat 203 or 204 is first adjusted with the switches 100 and 101 open as for the main sweep, so that the mark made by the outgoing pulse with scale 24 reading zero coincides with the index 16, as hereinbefore described. Then, the switches 100 and 101 are closed and the rheostat 105 is adjusted until the mark again coincides with the index 16, if, as will usually occur, the mark shifts slightly when the switches are closed. Thus the zero range adjustments for the main and expanded sweeps are independent of each other, except that the main sweep zero should be set before switching to the expanded sweep.

Since the gain of the deflection amplifier on the expanded sweep is increased by a certain factor compared with the main sweep and the balance point remains at the range mark 16, an enlarged scale 108, Fig. 7, (having one-fourth the range of the main sweep scale 94 where the amplification is increased by a factor of 4) may be used in place of the scale 94 in Fig. 6. To use the scale 108 in the system of Fig. 2, it is necessary to close the switches 100 and 101 and set the pointer 23' at 10,000 yards. The oscilloscope trace will then cover the range from 0 to 20,000 yards in approximately the same space on the cathode-ray screen as is covered by the 0 to 80,000 yards scale when using the main sweep.

It is not necessary, however, to use the scale 108 or any scale on the oscilloscope screen with the expanded sweep, as the latter feature may be used in the same manner as the main sweep by setting the mark of the received pulse to the index 16 and reading the corresponding value of the range from the scale 24. The precision of setting is increased in proportion to the increased sensitivity of the amplifier.

Figure 8:
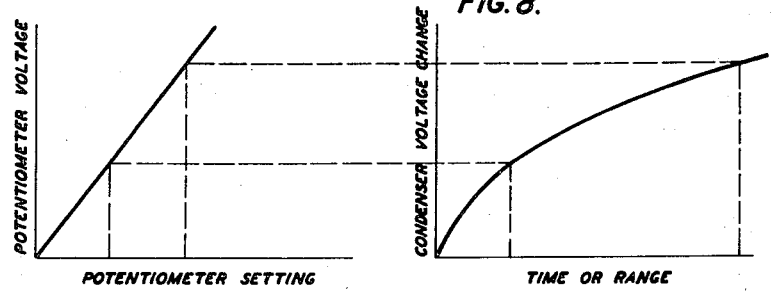
Figs. 8 and 9 are diagrams useful in explaining a certain source of error in range readings and how such error may be compensated.
Figure 9:
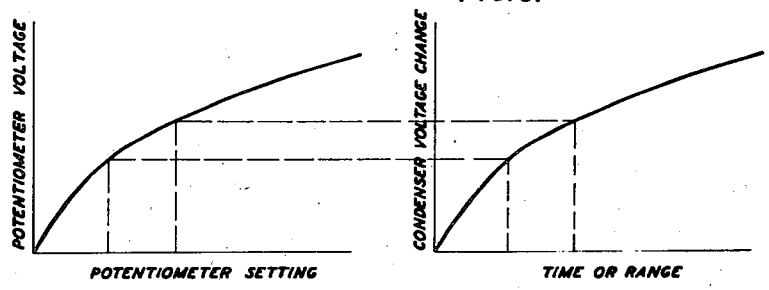

Figs. 8 and 9 will be used to explain the use of a linearizing resistance or other means of compensation in improving the accuracy of readings. The linearizing resistance is shown as a resistor 109 which is connected between the potentiometer arm 23 and one end of the potentiometer 18, in Fig. 2.

If, as usually preferable, the scale 24 is a linear one, and it is desired to have the measurement of time or range directly proportional to the position setting of the arm of the potentiometer, some provision or compensation must be made for the non-linearity of the time rate or voltage rise across the terminals of the condenser.

Fig. 8 represents, at the left, the relationship between potentiometer voltage and potentiometer setting for a linear scale employed with a linearly wound potentiometer. At the right-hand side of Fig. 8 there is represented the change of condenser voltage as a function of the time or range. It will readily be seen, as accentuated by the broken lines, that equal increments in potentiometer setting do not correspond to equal increments of time or range.

One method of compensation comprises employing a potentiometer the rate of change of resistance of which varies according to a suitable exponential law, while retaining the linear scale 24. If the curve between potentiometer voltage and potentiometer setting has the same curvature as the curve between condenser voltage change and time or range, the result is a compensating correction which makes the potentiometer setting linear with respect to the time or range. This condition is illustrated in Fig. 9.

It is evident that the condenser curve is substantially linear over the early portion of the rise. It is therefore possible to obtain a substantially linear relation between potentiometer setting and time or range by confining the voltage rise to the first portion only (for example, the first 2 per cent) of the supply voltage.

I have also found that the relation between potentiometer voltage and potentiometer setting may be brought to have substantially the same shape as the condenser curve by use of the fixed resistor 109, of proper value, between the potentiometer arm and one end of the potentiometer.

With the compensation afforded by the use of the resistor 109, it becomes feasible to use a considerably larger proportion of the supply voltage in charging the condenser. For example, in a circuit of the same type where a voltage rise of 50 per cent of the supply voltage is employed, the mid-range or maximum error with a linear potentiometer and linear scale would be about 10 per cent of the full scale reading. With a shunting resistance, however, the maximum error would be reduced to approximately 0.1 per cent of the full scale range.

If, as represented in Fig. 9, an exponential potentiometer is substituted, it is possible to use as much of the charging curve as may be desired.

It is readily appreciated that if the values of either of the elements 21 or 22 making up the timing circuit should vary with temperature additional error will result. While the timing elements may be maintained at constant temperature by known means, it has been found simpler and more economical to compensate for temperature variations. It is only required that the direct current potential drop in the potentiometer in the quiescent state be matched against the rise in voltage when the condenser is being charged. From the foregoing requirement in the case where the voltage rise employed in the measurements is small compared to the supply voltage, and hence the voltage rise is substantially linear, it was found that a first order correction for the effect of temperature changes can be made by using a condenser having a temperature coefficient of capacity change which is equal to and of the sign opposite that of the temperature coefficient of resistance change of the potentiometer. In the embodiment that was built, the potentiometer had a positive temperature coefficient of approximately 150 parts in a million per degree centigrade, which was counterbalanced by a negative temperature coefficient of like amount for the condenser. The temperature coefficient of the condenser was adjusted by combining in proper proportions silver-mica condensers having a positive coefficient of about fifteen parts per million per degree centigrade with a commercial make of ceramic condenser having a negative coefficient of about 600 parts per million.

Another refinement that is useful here as well as in other systems employing cathode-ray display devices, is a means for blanking out the return trace of the cathode-ray. In the present system the return trace takes place during the discharge of the condenser 22. To provide a square wave properly synchronized for blanking out the return trace a tap 205 is made at a suitable point on the resistor 76 and a connection made through a lead 130 to the input of a blanking amplifier 131. The output of the amplifier 131 is impressed upon a control grid 132 in the cathode-ray tube, which grid is conveniently located between the cathode, shown at 133, and the deflecting plates. Suitable collimating means are assumed to be employed but these are omitted from the drawing for the sake of clarity.

At the proper instant a positive voltage appears at the tap 205 and the lead 130 applies this voltage to the amplifier 131. The amplifier furnishes a negative voltage to the grid 132, which voltage is adjustable by controlling the amplifier 131. The negative voltage is applied to the grid 132 only during the interval when blanking is desired.

What is claimed is:

1. A time measuring system comprising a source of electromotive force, a potentiometer and a timing circuit connected in parallel with each other and with said source of electromotive force, said timing circuit consisting of a resistor and a condenser each of fixed value, means to select a variable intermediate point in said potentiometer, and means to indicate the potential difference between the selected point in said potentiometer and a fixed point in said timing circuit.

2. A system for measuring recurrent substantially equal time intervals, said system comprising means to establish a reference potential, means to establish a variable comparison potential varying through a range of potentials including the reference potential at a predetermined time rate, means to select the initial potential of said range of potential variation, means to start the said potential variation simultaneously with the start of each recurrent time interval, and means to compare the instantaneous value of the said variable potential with the reference potential at the end of each said time interval, whereby the selected initial potential may be varied until the potential variation of said source of variable potential during the interval to be measured is equal to the potential difference between the selected initial potential and the reference potential.

3. In a system for measuring recurrent substantially equal time intervals, said system including a source of electromotive force, a resistor and a condenser in series connection with said source of electromotive force, and a potentiometer to establish a reference potential of fixed value relative to the potential of said source of electromotive force, the method which comprises selecting an intermediate point on said potentiometer, starting a transient current in said condenser through said resistor from said source of electromotive force simultaneously with the beginning of each said time interval, and comparing the potential of said selected point on the potentiometer with the potential of said condenser at the end of each said time interval.

4. A system for measuring recurrent substantially equal time intervals, said system comprising a source of reference potential, a source of variable potential, the amount of which may be varied repeatedly from an arbitrary initial potential at a predetermined time rate through a range of potentials including the potential of said reference, means to select the value of the initial potential of said source of variable potential, means to control the potential variation of said source to start simultaneously with the beginning of each said time interval, means for comparing the instantaneous potential of said source of variable potential with the said reference potential, means to actuate said comparing means at the finish of each said interval, whereby the potential variation of said source of variable potentials during the interval to be measured may be made equal to the potential difference between the selected initial potential and the reference potential.

5. Apparatus comprising a source of electromotive force, a timing circuit and a potentiometer connected with said source of electromotive force, said timing circuit having a given characteristic relationship between voltage and time, said potentiometer having a movable contactor and a scale for indicating the setting of said movable contactor, and said potentiometer having the same characteristic relationship between voltage and the indication of said scale as given between voltage and time for the said timing circuit, whereby non-linearity of said characteristic relationship is compensated in relating the scale indication to the time.

6. Apparatus comprising a source of electromotive force, a timing circuit, a potentiometer for establishing voltages for comparison with a varying voltage in said timing circuit, said timing circuit and said potentiometer being connected with said source of electromotive force, said timing circuit having a given characteristic relationship between voltage and time, said potentiometer having a movable contactor and a scale for indicating the setting of said movable contactor, and a resistor connected between the said movable contactor and a fixed point in said potentiometer, whereby the characteristic relationship between the voltage of the movable contactor and the indication of said scale is rendered non-linear to compensate for the non-linearity of the said characteristic relationship between voltage and time in said timing circuit in relating the scale indication to the time in making a measurement.

7. A time measuring system comprising an electronic device having an anode, a cathode and a control electrode, means for producing and impressing upon said control electrode an exponentially rising potential of fixed time constant, means for applying a potential to said cathode and means for varying said cathode potential to determine a measured time delay period with respect to the start of said exponentially rising potential by an amount determined by said cathode potential.

EDMOND BRUCE.

REFERENCES CITED

The following references are of record in the file of this patent:

UNITED STATES PATENTS

| Number | Name | Date |
|---|---|---|
| 2,301,197 | Bradford | Nov. 10, 1942 |
| 2,322,528 | Lewis | June 22, 1943 |
| 2,189,549 | Hershberger | Feb. 6, 1940 |
| 2,227,598 | Lyman et al. | Jan. 7, 1941 |
| 2,153,140 | Diehl et al. | Apr. 4, 1939 |
| 2,144,873 | Dimond | Jan. 24, 1939 |